June 6, 1961 K. F. LANG ET AL 2,987,559
PROCESS FOR PREPARING 1,3,5-TRIPHENYL-BENZENE
Filed Nov. 6, 1958
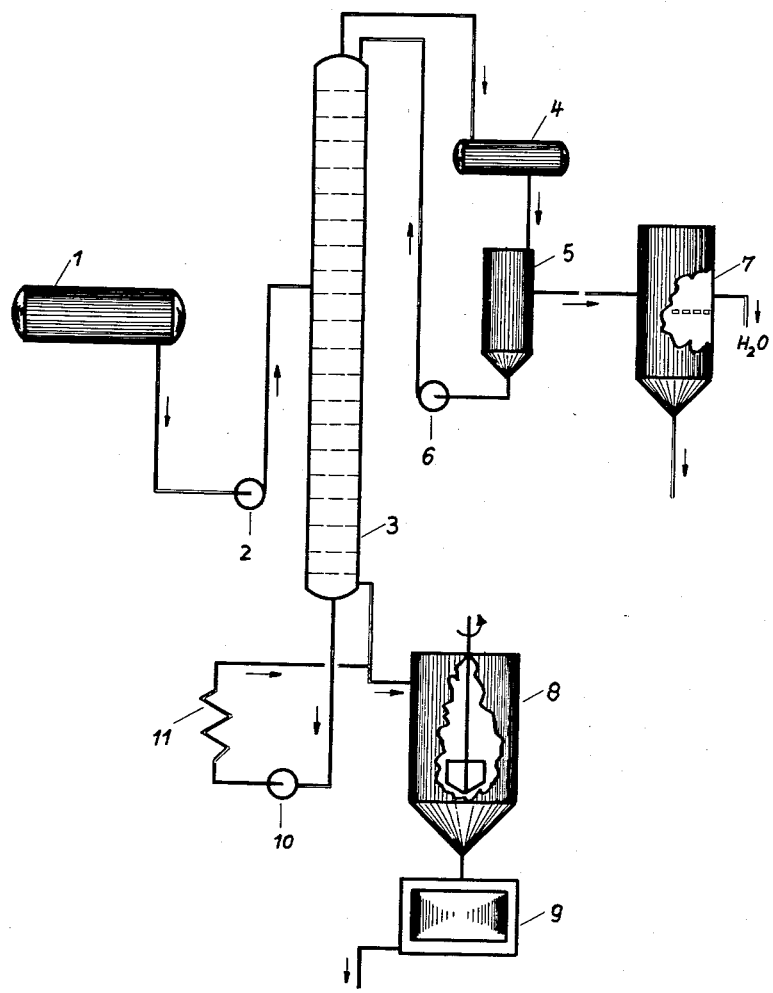
INVENTORS
KARL FRIEDRICH LANG
MAX FROITZHEIM
BY
DEZSOE STEINHERZ
ATTORNEY

United States Patent Office 2,987,559
Patented June 6, 1961

2,987,559
PROCESS FOR PREPARING 1,3,5-TRIPHENYL-BENZENE
Karl Friedrich Lang, Frankfurt am Main, and Max Froitzheim, Castrop-Rauxel, Germany, assignors to Rutgers-Aktiengesellschaft, Frankfurt am Main, Germany
Filed Nov. 6, 1958, Ser. No. 772,298
Claims priority, application Germany Nov. 9, 1957
4 Claims. (Cl. 260—668)

This invention relates to the preparation of 1,3,5-triphenyl-benzene and it has particular relation to the condensation of 3 mols of acetophenone to 1,3,5-triphenyl-benzene with the splitting off of water.

Condensation of acetophenone to 1,3,5-triphenyl-benzene has been known in the art and was carried out mostly with the use of hydrochloric acid as the condensing agent, because it was found that condensation of the acetophenone does not take place uniformly according to the desired condensation reaction in the use of other condensing agents (see Beilstein, Handbuch der Organischen Chemie, 4th edition, vol. V, page 377).

It has now been found that acetophenone can be condensed by proceeding in the manner described hereinafter in the presence of a small amount of sulfuric acid, on a commercial scale with good yields to 1,3,5-triphenyl-benzene of bright color and of a degree of purity which meets industrial requirements and can be increased, if desired, by recrystallization of the condensation product from benzine, methanol or toluene. This result is unexpected in view of prior art teachings, according to which sulfuric acid is not suitable as a condensing agent for the conversion of acetophenone into 1,3,5-triphenyl-benzene.

*Example*

The starting material is technically pure acetophenone which boils in the range between 196° C. and 202° C. under normal atmospheric pressure and has a solidification point of 10°–15° C. This starting material is mixed with 0.3% by weight of concentrated sulfuric acid and the mixture is stored in vessel 1 shown in the appended diagrammatic illustration.

Through a centrifugal pump 2 the mixture is continuously fed to a distillation column 3 which has about 30 bubble trays of conventional design. To the distillation system shown heat is supplied in such amount that from the head of the column water-containing acetophenone is distilled off. Part of this acetophenone is reintroduced into the distillation system as reflux as shown at 4, 5, 6. Or this water-containing acetophenone is collected in container 7, from which water and acetophenone can be discharged. The discharged acetophenone can be reintroduced into the process. The sump of the column is kept at a temperature in the range of 240°–250° C. by forcing the sump by the pump 10 through the tube furnace 11 and keeping it in circulation. Half of the quantity of the material in the sump is discharged continuously. The use of a temperature, at which about 20% of 1,3,5-triphenyl-benzene are present in the discharged sump product, gives very satisfactory results and is, therefore, preferred.

The discharged dark sump product is allowed to cool in a container 8 until the 1,3,5-triphenyl-benzene is solidified, and is then subjected to centrifuging in a centrifuge 9. The liquid separated in the centrifuge is introduced into container 1. The crude 1,3,5-triphenyl-benzene is removed from the centrifuge and is then washed with toluene or another solvent. The washed product has a melting point of 167°–171° C. The yield of 1,3,5-triphenyl-benzene amounts to about 80% based on the reacted acetophenone.

It has been found that the above described process can be carried out in apparatus consisting of iron, because the acetophenone counteracts corrosion. It will be understood that the present invention is not limited to the specific conditions and details described above and can be carried out with various modifications without departing from the scope of the invention as defined in the appended claims. For example, the acetophenone used as starting material is fed to the distilling column with a temperature of 20 to 180° C. The product accumulating in the sump of the distillation column is kept at a temperature in the range of 220° to 260° C., preferably at 245° to 250° C. By maintaining this last mentioned temperature, the discharged sump product will contain about 20% of 1,3,5-triphenyl-benzene whereby the reaction mixture passing through the distillation system from feed to discharge is subjected to heating to condensation temperature the time depending on the capacity of the apparatus. The concentrated sulfuric acid is used in an amount of 0.2 to 0.5% based on the weight of the acetophenone used as starting material.

The parts stated above are by weight if not otherwise stated.

What is claimed is:

1. A process for preparing 1,3,5-triphenyl-benzene by condensation of acetophenone, comprising mixing acetophenone with a small amount of sulfuric acid; continuously introducing the resulting mixture which consists of acetophenone and as catalyst said sulfuric acid alone, into a distilling column in which condensation of the acetophenone to 1,3,5-triphenyl-benzene is carried out at elevated temperature; distilling off a mixture of water and acetophenone at the head of the column; keeping the temperature in the sump of the column in the range of 220 to 260° C., and continuously discharging the product accumulating in the sump.

2. A process as claimed in claim 1, in which the sulfuric acid is used in an amount of 0.2 to 0.5% based on the weight of acetophenone used as starting material.

3. A process as claimed in claim 1, in which the discharged sump product is subjected to cooling and subsequently to centrifuging in order to separate the 1,3,5-triphenyl-benzene from accompanying liquid and said liquid is reintroduced as starting material into the process.

4. A process as claimed in claim 1, in which the acetophenone distilled off at the head of the distilling column is separated from water and reintroduced into the process as a starting material.

References Cited in the file of this patent
UNITED STATES PATENTS

| | | |
|---|---|---|
| 1,977,178 | Dohse | Oct. 16, 1934 |
| 2,419,142 | Ipatieff et al. | Apr. 15, 1947 |
| 2,431,754 | Ipatieff et al. | Dec. 2, 1947 |

OTHER REFERENCES

"Organic Syntheses," 1922, vol. 2, page 41.
"Journal of the Russian Physical Chemical Society," 1930, vol. 62, page 1407.
"Journal for Praktische Chemie" (Germany), 1934, vol. 140, page 229.